US012056974B2

(12) United States Patent
Haddad

(10) Patent No.: US 12,056,974 B2
(45) Date of Patent: Aug. 6, 2024

(54) METHOD AND SYSTEM FOR ACCESS TO A SECURED BUILDING AND A SECURED LOCKER SYSTEM

(71) Applicant: 1VALET CORP., Gatineau (CA)

(72) Inventor: Hanna Haddad, Ottawa (CA)

(73) Assignee: 1VALET CORP., Gatineau (CA)

( * ) Notice: Subject to any disclaimer, the term of this patent is extended or adjusted under 35 U.S.C. 154(b) by 0 days.

(21) Appl. No.: 17/530,395

(22) Filed: Nov. 18, 2021

(65) Prior Publication Data

US 2022/0076517 A1  Mar. 10, 2022

Related U.S. Application Data

(63) Continuation-in-part of application No. 17/041,945, filed as application No. PCT/CA2020/050694 on May 22, 2020, now Pat. No. 11,443,580.
(Continued)

(51) Int. Cl.
*G07C 9/32* (2020.01)
*G06Q 10/0833* (2023.01)
(Continued)

(52) U.S. Cl.
CPC ............ *G07C 9/32* (2020.01); *G06Q 10/0833* (2013.01); *G06Q 10/0837* (2013.01); *G07C 9/00904* (2013.01); *G07C 9/38* (2020.01)

(58) Field of Classification Search
CPC ........ G07C 9/32; G07C 9/38; G07C 9/00904; G06Q 10/0833; G06Q 10/0837
See application file for complete search history.

(56) References Cited

U.S. PATENT DOCUMENTS 7,248,160 B2 *  7/2007  Mangan ............. G06Q 10/0833
                                                705/333
8,346,676 B1 *  1/2013  Bennett ............ G06Q 10/08345
                                                705/333
(Continued)

FOREIGN PATENT DOCUMENTS

CN    107134071 A  *  9/2017
CN    107633578 A  *  1/2018
(Continued)

OTHER PUBLICATIONS

Stanislaw Iwan, "Analysis of parcel locker's efficiency as the last mile delivery solution—the results of the research in Poland", published by Elsevier in 2015, all pages (Year: 2015).*
(Continued)

*Primary Examiner* — Omar Zeroual
(74) *Attorney, Agent, or Firm* — Sterne, Kessler, Goldstein & Fox P.L.L.C.

(57) ABSTRACT

Embodiments of the present invention provide for methods and systems for accessing a secured building by delivery personnel for delivery of a package including return of a package. The method includes retrieving information from a code associated with a carrier and an address. The code may be a barcode with encoded information. The method further includes confirming that the address is associated with the secured building and further validating the carrier as an authorized carrier by an identification of the carrier. The method further includes validating a status associated with the information to be "in transit" or "out for delivery" for delivery of a package, or "waiting for pick-up" for return of a package. The method may further include checking that an update to the status is within 24 hours. Upon positive response of the status, the method further includes allowing access to the secured building or eventually allowing access to a locker system in the building. Other embodiments may
(Continued)

provide for methods and systems for accessing a secured locker system in proximity to a building by delivery personnel for delivery of a package including return of a package. In a nutshell, the embodiments may provide a simpler way for recipients/consumers to return packages to the senders/retailers. Additionally, other embodiments may further provide for methods and systems for performing additional security and management functions by using one or more of a motion detector, a body heat sensor, a camera with a face recognition element and/or a voice recognition element, a display screen, and coordinating them with the building operating system (BOS).

19 Claims, 8 Drawing Sheets

Related U.S. Application Data

(60) Provisional application No. 62/852,605, filed on May 24, 2019.

(51) Int. Cl.
  G06Q 10/0837 (2023.01)
  G07C 9/00 (2020.01)
  G07C 9/38 (2020.01)

(56) References Cited

U.S. PATENT DOCUMENTS

| | | | |
|---|---|---|---|
| 9,652,912 B2* | 5/2017 | Fadell | G06Q 10/08 |
| 9,691,199 B1* | 6/2017 | Rapp | G07C 9/00571 |
| 10,019,860 B1* | 7/2018 | Kim | G07C 9/00896 |
| 10,733,328 B1* | 8/2020 | Perkins | G06F 21/86 |
| 10,861,265 B1* | 12/2020 | Merkley | G06V 20/52 |
| 11,074,790 B2* | 7/2021 | Scalisi | G08B 3/10 |
| 11,144,868 B1* | 10/2021 | McBride | G06Q 10/0834 |
| 11,184,589 B2* | 11/2021 | Scalisi | G08B 13/19684 |
| 11,250,373 B1* | 2/2022 | Condron | H04W 4/029 |
| 11,625,971 B2* | 4/2023 | Dotterweich | G07C 9/00896 705/339 |
| 2002/0138548 A1* | 9/2002 | Neebe | G07F 9/002 709/201 |
| 2002/0156645 A1* | 10/2002 | Hansen | G07F 17/13 705/26.1 |
| 2004/0181570 A1* | 9/2004 | Kaneko | G06Q 10/08 709/200 |
| 2004/0229569 A1* | 11/2004 | Franz | H04M 3/16 455/66.1 |
| 2004/0254808 A1* | 12/2004 | Bennett | G06Q 10/10 705/26.1 |
| 2006/0208852 A1* | 9/2006 | Wenzlik | G07C 9/00912 340/5.2 |
| 2006/0229895 A1* | 10/2006 | Kodger, Jr. | G06Q 10/083 705/333 |
| 2007/0247277 A1* | 10/2007 | Murchison | G07C 9/00896 340/5.2 |
| 2008/0004995 A1* | 1/2008 | Klingenberg | G06Q 10/0832 705/28 |
| 2008/0129498 A1* | 6/2008 | Howarter | G08B 3/10 340/541 |
| 2009/0119232 A1* | 5/2009 | Mercier | G07F 17/26 705/407 |
| 2011/0130134 A1* | 6/2011 | Van Rysselberghe | A47G 29/141 455/422.1 |
| 2014/0149308 A1* | 5/2014 | Ming | G06Q 10/0833 705/333 |
| 2014/0190081 A1* | 7/2014 | Wanjohi | A47G 29/126 49/504 |
| 2014/0258168 A1* | 9/2014 | Crawford | G06Q 10/0836 705/339 |
| 2014/0267740 A1* | 9/2014 | Almomani | H04N 7/186 348/156 |
| 2014/0340196 A1* | 11/2014 | Myers | G07C 9/00309 340/5.61 |
| 2015/0081583 A1* | 3/2015 | Butler | H04W 4/025 705/333 |
| 2015/0106296 A1* | 4/2015 | Robinson | G06Q 10/0838 705/339 |
| 2015/0109104 A1* | 4/2015 | Fadell | G08B 27/005 340/5.7 |
| 2015/0112885 A1* | 4/2015 | Fadell | G08B 29/185 705/330 |
| 2015/0112887 A1* | 4/2015 | Camp | G06Q 10/0836 705/339 |
| 2015/0120529 A1* | 4/2015 | Faaborg | G06Q 10/083 705/330 |
| 2015/0142692 A1* | 5/2015 | Gillen | G06Q 10/083 705/330 |
| 2015/0145643 A1* | 5/2015 | Fadell | G07C 9/27 340/5.51 |
| 2015/0154850 A1* | 6/2015 | Fadell | G06Q 10/083 340/501 |
| 2015/0156030 A1* | 6/2015 | Fadell | G06Q 10/083 700/90 |
| 2015/0156031 A1* | 6/2015 | Fadell | G08B 27/003 700/90 |
| 2015/0186840 A1* | 7/2015 | Torres | A47F 10/02 705/339 |
| 2015/0312531 A1* | 10/2015 | Samad | H04N 7/186 348/143 |
| 2016/0066733 A1* | 3/2016 | Gozar | A47G 29/141 232/18 |
| 2016/0216106 A1* | 7/2016 | Motoyama | G07F 17/13 |
| 2016/0219254 A1* | 7/2016 | Hu | H04N 7/186 |
| 2016/0247344 A1* | 8/2016 | Eichenblatt | A47G 29/141 |
| 2016/0307380 A1* | 10/2016 | Ho | G10L 17/00 |
| 2016/0335595 A1* | 11/2016 | Levy | G06Q 10/087 |
| 2017/0098188 A1* | 4/2017 | Aryeetey | G06Q 10/109 |
| 2017/0124510 A1* | 5/2017 | Caterino | A47G 29/141 |
| 2017/0220976 A1* | 8/2017 | Schmidt | G06Q 10/083 |
| 2017/0262820 A1* | 9/2017 | Al Salah | G07C 5/02 |
| 2017/0286905 A1* | 10/2017 | Richardson | G06Q 10/0836 |
| 2017/0293885 A1* | 10/2017 | Grady | G06K 7/10009 |
| 2018/0075681 A1* | 3/2018 | Scalisi | G06K 7/1413 |
| 2018/0165631 A1* | 6/2018 | Romero | G08B 13/19665 |
| 2018/0165637 A1* | 6/2018 | Romero | G06Q 10/0836 |
| 2018/0170674 A1* | 6/2018 | Luckay | B65G 1/137 |
| 2018/0186454 A1* | 7/2018 | Luckay | G06Q 10/0836 |
| 2019/0066516 A1* | 2/2019 | Kuhara | G08G 1/202 |
| 2019/0087775 A1* | 3/2019 | Buehre | G06Q 10/0833 |
| 2019/0137290 A1* | 5/2019 | Levy | B60Q 1/5035 |
| 2019/0205831 A1* | 7/2019 | Kanaoka | H04W 4/021 |
| 2019/0213573 A1* | 7/2019 | Zelten | G06Q 20/407 |
| 2019/0265717 A1* | 8/2019 | McHale | G06Q 10/0832 |
| 2019/0279485 A1* | 9/2019 | VanBlon | H04L 63/107 |
| 2020/0012245 A1* | 1/2020 | Marin Pulido | G06Q 10/0836 |
| 2020/0151982 A1* | 5/2020 | Shell | G06Q 10/0832 |
| 2020/0158414 A1* | 5/2020 | Farlotti | G07F 9/105 |
| 2020/0226706 A1* | 7/2020 | Ramarao | G06Q 10/08355 |
| 2020/0281386 A1* | 9/2020 | Knox | A47G 29/22 |
| 2020/0312068 A1* | 10/2020 | Scalisi | G06Q 10/0833 |
| 2020/0349796 A1* | 11/2020 | Gokcebay | G07C 9/00896 |
| 2021/0127881 A1* | 5/2021 | Estill | A47G 29/20 |
| 2021/0182786 A1* | 6/2021 | Estill | H04W 4/029 |
| 2021/0217261 A1* | 7/2021 | Green | G08C 17/02 |
| 2022/0027846 A1* | 1/2022 | Shroff | G06Q 10/0833 |
| 2022/0076517 A1* | 3/2022 | Haddad | G07C 9/38 |
| 2022/0112760 A1* | 4/2022 | Demele | E05B 65/0888 |
| 2022/0114546 A1* | 4/2022 | Carter | H04W 12/069 |

FOREIGN PATENT DOCUMENTS

| | | | | |
|---|---|---|---|---|
| EP | 3817408 A1 * | 5/2021 | | G06F 3/04842 |
| WO | WO-0131827 A2 * | 5/2001 | | G06Q 10/08 |
| WO | WO-03081560 A1 * | 10/2003 | | G07C 5/0858 |
| WO | WO-2007084357 A2 * | 7/2007 | | G06Q 10/08 |
| WO | WO-2016081794 A1 * | 5/2016 | | G06F 3/048 |

(56) References Cited

FOREIGN PATENT DOCUMENTS

| WO | WO-2016131043 A1 | * | 8/2016 | ........... A47G 29/124 |
| WO | WO-2017058924 A1 | * | 4/2017 | ......... A47G 29/1201 |
| WO | WO-2017178622 A1 | * | 10/2017 | ........... A47G 29/141 |
| WO | WO-2017186287 A1 | * | 11/2017 | ............... B66B 1/46 |
| WO | WO-2017192276 A1 | * | 11/2017 | ......... G06Q 10/0631 |
| WO | WO-2018029593 A1 | * | 2/2018 | ............. A47G 29/14 |
| WO | WO-2019200088 A1 | * | 10/2019 | ........... B64C 1/1415 |
| WO | WO-2020171242 A1 | * | 8/2020 | |

OTHER PUBLICATIONS

Tallam, Deepak, "Unattended delivery to the home: and assessment of the security implications", published International Journal of Retail and distribution management in 2003, all pages (Year: 2003).*

Extended European Search Report and Written Opinion of the European Patent Office for European Application No. 20765181, mailed Jan. 4, 2022, 10 pages.

International Search Report, and Written Opinion of the International Searching Authority for International Application No. PCT/CA2020/050694, mailed Aug. 26, 5 pages.

* cited by examiner

METHOD AND SYSTEM FOR ACCESS TO A SECURED BUILDING AND A SECURED LOCKER SYSTEM

CROSS-REFERENCE TO RELATED APPLICATIONS

The present application is a Continuation-in-Part of U.S. application Ser. No. 17/041,945, filed Sep. 25, 2020, which is a U.S. National Phase Application under 35 U.S.C. 371 of International Application No. PCT/CA2020/050694, filed May 22, 2020, which claims priority to U.S. Application No. 62/852,605, filed May 24, 2019. The foregoing applications are incorporated by reference herein in their entirety.

FIELD OF THE DISCLOSURE

The present disclosure generally relates to the field of ensuring building security and providing secure delivery services including return services. In particular embodiments or aspects, the disclosure relates to methods and systems for accessing a secured building and a secured locker system located outside the secured building.

BACKGROUND

Access to a secured building, for a non-tenant, generally require a tenant's presence at the building to permit access. Similarly, for service providers who may require access to a building, or a unit within the building, generally require a tenant's presence at the building and/or the unit to permit access. Service providers may include any party who requires access to the building and/or a unit within a building to provide a service. The service may be a plumbing service, and electrical service, a delivery of a package, mail, food, etc.

However, in particular for delivery services (e.g., package, mail, food, etc.), a delivery person may provide such services without accessing a secured building. For example, when the delivery person is unable to access the secured building, he/she may leave the package or parcel within a reasonable distance from the building, e.g., outside the lobby of the secured building. However, this may result in missing or stolen packages or parcels, and also personal information of the intended package recipients (e.g., resident's name, detailed address, contact number, purchase history, etc.) being improperly disclosed or misappropriated.

Furthermore, in order to return a package to the retailer, the recipient would generally need to contact the retailer (e.g., Amazon) and request for return of a package and/or a refund. The retailer would generally provide an electronic return label for the recipient to print out and attach to the package. Sometimes, the retailer would include a return label in the package for delivery in advance. Accordingly, the recipient may drop off the package with a return label at a designated drop off location (e.g., post office, a UPS facility, a FedEx facility etc.). Sometimes the recipient may need to pay for return shipping.

To summarize, a service provider attempting to access a building may be unable to provide its services if a tenant is not present to permit access, where required, or otherwise, the tenant is unable to permit access as required according to the building security protocols. Furthermore, a carrier or a delivery service provider attempting to provide delivery services without accessing a secured building may be unable to guarantee a satisfactory service standard or level that may be reasonably expected by the intended recipient, given the likelihood that a package or parcel being stolen or missing, or the possibility that the recipient's personal information may be obtained or misappropriated by unknown, unauthorized, random person, or the like. Additionally, the package recipients would expect to return unwanted packages in a simpler way to avoid running errands.

Accordingly, there is a need for a method and system that may be used to improve the access to a secured building for a service provider, allow a delivery service provider to securely provide delivery services without the need to access a secured building, and also allow a simpler way for a recipient to return a package to a retailer.

This background information is provided to reveal information believed by the applicant to be of possible relevance to the present invention. No admission is necessarily intended, nor should be construed, that any of the preceding information constitutes prior art against the present invention.

SUMMARY

It is an object of the present disclosure to provide a method and system for accessing a secured building. In embodiments, a secured building may be in the form of a multi-storey structure such as apartments or condominiums, a single-storey structure, a split-level structure, a multiplex structure such as duplex and triplex, or the like. In embodiments, a secured building may be a combination of any or all of the aforementioned structures. For example, a secured building may be a gated community with security protocols, a closed perimeter of walls and/or fences, or the like.

An aspect of the invention provides for a method of accessing a secured building. The method includes retrieving information from a code associated with a carrier and an address. The method further includes confirming that the address is associated with the secured building. The method further includes validating the carrier as an authorized carrier. For delivery of a package, the method further includes validating a status associated with the information to be one of: in transit; and out for delivery. Alternatively for return of a package, the method further includes validating a status associated with the information to be waiting for pick-up. The method further includes allowing access to the secured building. In some embodiments, prior to allowing access to the secured building, the method further includes checking an that update to the status is within 24 hours. In some embodiments the step of validating the carrier as an authorized carrier includes determining an identification of the carrier associated with the information. In some embodiments the code is a barcode. In some embodiments the barcode is one of: 1 dimensional linear bar code; 2-dimensional bar code, an image, specialized augmented postal code; intelligent mail barcode; and electronic product code. In some embodiments the step of allowing access to the secured building comprises opening a secured door. In some embodiments the information is a tracking code. In some embodiments the method further includes displaying an access code for accessing a locker system including a locker associated with the address. In some embodiments, the method further includes receiving, by the locker system, the access code. In some embodiments, the method further includes validating the access code. In some embodiments, the method further includes allowing access to the locker. In some embodiments, the step of validating the access code includes: checking that a time window associated the access code is not expired. In some embodiments, the method further includes retrieving the information from the code associated with carrier and the address. In some embodiments, the method further includes confirming that the address is associated with the secured building. In some embodiments, the method further includes validating the carrier as the authorized carrier. In some embodiments, for delivery of a package, the method further includes validating a second status associated with the information to be one of in transit and out for delivery. In some embodiments, alternatively for return of a package, the method further includes validating a second status associated with the information to be waiting for pick-up. In some embodiments, the method further includes allowing access to a locker system including a locker associated with the address. In some embodiments, the method further includes sending a message to a device associated with the address, the message indicating that access to the secured building has been granted for the carrier. In some embodiments, the method further includes sending a message to a device associated with the address, the message indicating that access to the locker has been granted for the carrier. In some embodiments, the method further includes the device is a mobile of a tenant associated with the address. In some embodiments, the locker system may include a plurality of locker/mail boxes. The locker system and a plurality of locker/mail boxes may be located separately. In some embodiments, the locker system may refer to a designated area, a parcel management area or a storage area, which may be a room, a space, a unit, a floor, a corner, or the like in the secured building including its rooftop, basement or any structure directly or indirectly attached to the building which would require the same access or security protocols. In some embodiments, accessing the locker system in the building may include accessing one or more of secured access doors.

Another aspect of the invention provides for a system for accessing a secured building. The system includes at least one processor. The system further includes a non-transient computer readable memory for storing instructions which when executed by the at least one processor cause the system to perform the methods described herein. For example, such a system is caused to retrieve information from a code associated with a carrier and an address. The system is further caused to confirm that the address is associated with the secured building. The system is further caused to validate the carrier as an authorized carrier. For delivery of a package, the system is further caused to validate a status associated with the information to be one of in transit; and out for delivery. Alternatively for return of a package, the system is further caused to validate a status associated with the information to be waiting for pick-up. The system is further caused to allow access to the secured building. In some embodiments, the instructions further cause the system to check that an update to the status is within 24 hours. In some embodiments, the instructions which cause the system to validating the carrier as an authorized carrier includes: instructions to determine an identification of the carrier associated with the information. In some embodiments, the code is a barcode. In some embodiments, the barcode is one of: 1 dimensional linear bar code; 2-dimensional bar code, an image, specialized augmented postal code; intelligent mail barcode; and electronic product code. In some embodiments, the instructions which cause the system to allow access to the secured building includes: instructions to open a secured door. In some embodiments, the information is a tracking code. In some embodiments, the instructions further cause the system to: display an access code for accessing a locker system including a locker associated with the address. In some embodiments, instructions further cause the system to receive, by the locker system, the access code. In some embodiments, instructions further cause the system to validating the access code. In some embodiments, instructions further cause the system to allow access to the locker. In some embodiments, the instructions which cause the system to validating the access code includes: instructions to check that a time window associated the access code is not expired. In some embodiment, the instructions further cause the system to retrieve the information from the code associated with carrier and the address. In some embodiments, instructions further cause the system to confirm that the address is associated with the secured building. In some embodiments, instructions further cause the system to validate the carrier as an authorized carrier. In some embodiments, for delivery of a package, instructions further cause the system to validate a second status associated with the information to be one of: in transit; and out for delivery. In some embodiments, alternatively for return of a package, instructions further cause the system to validate a second status associated with the information to be waiting for pick-up. In some embodiments, instructions further cause the system to allow access to the locker system including a locker associated with the address. In some embodiments, instructions further cause the system to send a message to a device associated with the address, the message indicating that access to the secured building has been granted for the carrier. In some embodiments, instructions further cause the system to send a message to a device associated with the address, the message indicating that access to the locker has been granted for the carrier. In some embodiments, the device is a mobile of a tenant associated with the address.

Another object of the present disclosure is to provide a method and system for accessing a secured locker system, which would enable delivery service providers to securely provide delivery services without a need to access a secured building. In some embodiments, the locker system may be located in proximity to a secured building, for example, being reasonably close to the building horizontally and/or vertically. In one embodiment, it may refer to being in a public underground passageway or tunnel underneath a secured building. In another embodiment, it may refer to being in a surface parking lot near a secured building. In other embodiments, it may refer to any designated area or space outside a secured building. In some embodiments, accessing the secured locker system may include accessing one or more of secured access doors. In some embodiments, the locker system may be installed together with an entry console used for receiving one or more delivery packages.

In accordance with an aspect of the present invention, there is provided a method of accessing a secured locker system located in proximity to a secured building. The method includes retrieving information from a code associated with a carrier and an address. The method further includes confirming that the address is associated with the secured building. The method further includes validating the carrier as an authorized carrier. For delivery of a package, the method further includes validating a status associated with the information to be one of: in transit; and out for delivery. Alternatively for return of a package, the method further includes validating a status associated with the information to be waiting for pick-up. The method further includes allowing access to the secured locker system. In some embodiments, prior to allowing access to the secured locker system, the method further includes checking that an update to the status is within 24 hours. In some embodiments, the step of validating the carrier as an authorized carrier includes determining an identification of the carrier associated with the information. In some embodiments, the code is a barcode. In some embodiments, the barcode is one of: 1 dimensional linear bar code; 2-dimensional bar code, an image, specialized augmented postal code; intelligent mail barcode; and electronic product code. In some embodiments, the step of allowing access to the secured locker system comprises opening a secured door. In some embodiments, the information is a tracking code. In some embodiments, the method further includes displaying an access code for accessing a locker system including a locker associated with the address. In some embodiments, the method further includes receiving, by the locker system, the access code. In some embodiments, the method further includes validating the access code. In some embodiments, the method further includes allowing access to the locker. In some embodiments, the step of validating the access code includes: checking that a time window associated the access code is not expired. In some embodiments, the method further includes retrieving the information from the code associated with carrier and the address. In some embodiments, the method further includes confirming that the address is associated with the secured building. In some embodiments, the method further includes validating the carrier as the authorized carrier. In some embodiments, for delivery of a package, the method further includes validating a second status associated with the information to be one of in transit and out for delivery. In some embodiments, alternatively for return of a package, the method further includes validating a second status associated with the information to be waiting for pick-up. In some embodiments, the method further includes allowing access to a locker system including a locker associated with the address. In some embodiments, the method further includes sending a message to a device associated with the address, the message indicating that access to the locker has been granted for the carrier. In some embodiments, the method further includes the device is a mobile of a tenant associated with the address. In some embodiments, the locker system may include a plurality of locker/mail boxes. The locker system and a plurality of locker/mail boxes may be located separately. In some embodiments, the locker system may refer to a designated area, a parcel management area or a storage area, which may be a room, a space, a unit, a floor, a corner, or the like in proximity to a secured building. For example, the locker system may be located in a public underground passageway or tunnel underneath a secured building, or in a surface parking lot near a secured building, or outside the lobby gate of a secured building.

In accordance with an aspect of the present invention, there is provided a system for accessing a secured locker system located in proximity to a secured building. The system includes at least one processor. The system further includes a non-transient computer readable memory for storing instructions which when executed by the at least one processor cause the system to perform the methods described herein. For example, such a system is caused to retrieve information from a code associated with a carrier and an address. The system is further caused to confirm that the address is associated with the secured building. The system is further caused to validate the carrier as an authorized carrier. For delivery of a package, the system is further caused to validate a status associated with the information to be one of in transit, and out for delivery. Alternatively for return of a package, the system is further caused to validate a status associated with the information to be waiting for pick-up. The system is further caused to allow access to the secured locker system. In some embodiments, the instructions further cause the system to check that an update to the status is within 24 hours. In some embodiments, the instructions which cause the system to validating the carrier as an authorized carrier includes: instructions to determine an identification of the carrier associated with the information. In some embodiments, the code is a barcode. In some embodiments, the barcode is one of: 1 dimensional linear bar code; 2-dimensional bar code, an image, specialized augmented postal code; intelligent mail barcode; and electronic product code. In some embodiments, the instructions which cause the system to allow access to the secured locker system includes: instructions to open a secured door. In some embodiments, the information is a tracking code. In some embodiments, the instructions further cause the system to: display an access code for accessing a locker system including a locker associated with the address. In some embodiments, instructions further cause the system to receive, by the locker system, the access code. In some embodiments, instructions further cause the system to validating the access code. In some embodiments, instructions further cause the system to allow access to the locker. In some embodiments, the instructions which cause the system to validating the access code includes: instructions to check that a time window associated the access code is not expired. In some embodiments, the instructions further cause the system to retrieve the information from the code associated with carrier and the address. In some embodiments, instructions further cause the system to confirm that the address is associated with the secured building. In some embodiments, instructions further cause the system to validate the carrier as an authorized carrier. In some embodiments, for delivery of a package, instructions further cause the system to validate a second status associated with the information to be one of: in transit; and out for delivery. In some embodiments, alternatively for return of a package, instructions further cause the system to validate a second status associated with the information to be waiting for pick-up. In some embodiments, instructions further cause the system to allow access to the locker system including a locker associated with the address. In some embodiments, instructions further cause the system to send a message to a device associated with the address, the message indicating that access to the locker has been granted for the carrier. In some embodiments, the device is a mobile of a tenant associated with the address.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

Throughout the appended drawings, like features are identified by like reference numerals.

DETAILED DESCRIPTION

Figure 1:
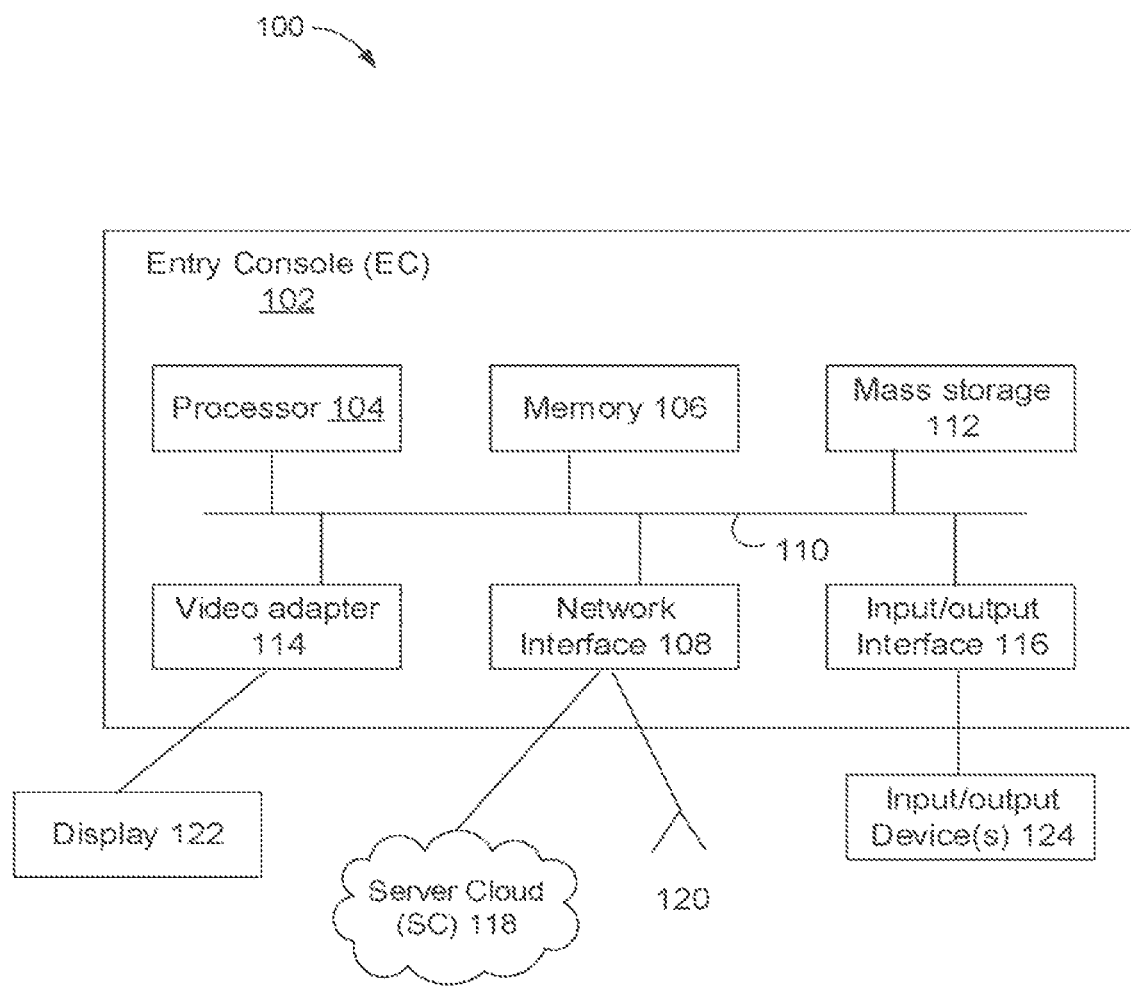
FIG. 1 is a block diagram of a built-in entry console within a computing and communications environment used for implementing devices and methods according to an embodiment of the present invention.

Embodiments described herein provide methods and systems for access to a secured building. Although example embodiments are described in reference to a service provider delivering a package, a person skilled in the art may apply the methods and systems as described by example embodiments herein for access to a building in the case of other service providers. Accordingly, delivery a package is but one example of a service provider, and thus example embodiments described herein are not limited to such example.

Every day, millions of packages or parcels are delivered throughout the world. In delivering the packages, service providers, for example, package delivery companies ("carriers") use various tracking mechanisms to ensure efficient and effective delivery of the packages. When a sender delivers a package (sends a package for delivery), the carriers/service provider attach an information label including a unique code, such as a bar code (or barcode) to the package. The barcode contains information identifying the package, the sender, sender's address, the recipient, the recipient's address and other information relating to the status of the delivery (tracking information). The tracking information can be used by the carrier personnel, the sender, and/or recipient to determine the status of the delivery.

Despite the delivery mechanisms and the availability of the tracking information used by the carriers, not all packages are delivered to the recipients. One common reason for packages not being delivered to the recipient is because the recipient is not available to receive the package when the delivery person is at the recipient's address. In such circumstances, the carrier delivery person would attempt to deliver the package at a later time hoping that the recipient would be available to receive the package, or the delivery person would leave the package at a nearby carrier center for pick up by the recipient, or even leave the package at the recipient's address (e.g., outside the recipient's apartment, outside the lobby of the building) unattended.

For return of a package, the original recipient (e.g., a consumer, a building resident) now becomes the new sender, and original sender (e.g., retailer) now becomes the new recipient. To avoid the confusion and for better consistency in the following, the term "recipient" is used to refer to the consumer regardless whether it is for delivery of a package or return of a package, and the term "sender" is used to refer to the retailer regardless whether it is for delivery of a package or return of a package, wherever applicable.

If the recipient wants to return a received package, generally he or she would need to contact the retailer or sender (e.g., visiting the retailer's website and/or contacting the customer service personnel of the retailer by email, phone or online chat etc.) for a return label, which is usually in the electronic form. The recipient would then print out the return label and attached it to the package, and drop off the package for return at a designated location in accordance with the rules of any particular retailer. Sometimes, the package would contain a return label when initially received by the recipient. A return label is an information label including a unique code, such as a bar code (or barcode) to the package. The barcode contains information identifying the package, the sender/retailer, sender/retailer's address, the recipient/consumer, the recipient/consumer's address and other information relating to the status of the delivery (tracking information). The tracking information can be used by the carrier personnel, delivery personnel, the sender/retailer, and/or recipient/consumer to determine the status of the delivery.

Alternatively, the retailer may arrange for a carrier or a delivery person to pick up the return package directly from the recipient or at the recipient's address. This may require a tenant's presence or a resident's presence at the building or at a designated place to permit access to a secured building or a secured locker system.

Similar problems are also likely for other service providers who require access to the building, such as an electrician, a plumber, a food delivery person, etc.

FIG. 1 is a block diagram of a built-in entry console (EC) 102 within a computing and communications environment 100 used for implementing the devices and methods disclosed herein. In some embodiments, the EC 102 is a device that connects to network infrastructure over a radio interface. In some embodiments, EC 102 is a Machine Type Communications (MTC) device (also referred to as a machine-to-machine (m2m) communication device). The EC 102 device may contain multiple instances of a component, such as multiple processors, memories, transmitters, receivers, etc. The EC 102 typically includes a processor 106, such as a Central Processing Unit (CPU), I/O interface 116 to connect with I/O devices (such as a barcode scanner and an access door), a memory 106, a network interface 108 and a bus 110 to connect the components of EC 102. EC 102 may optionally also include components such as a mass storage device 112, a video adapter 114 (shown in dashed lines).

The memory 106 may comprise any type of non-transitory system memory, readable by the processor 106. The bus 110 may be one or more of any type of several bus architectures including a memory bus or memory controller, a peripheral bus, or a video bus.

The one or more network interfaces 108, may include at least one of a wired network interface and a wireless network interface. The EC 102 can connect wirelessly to the console's cloud server 118 via network interface(s) 108 for sending and receiving information. The EC 102 can also include a radio access network interface 120 for connecting to other devices over a radio link.

The mass storage 112 may comprise any type of non-transitory storage device configured to store data, programs, and other information and to make the data, programs, and other information accessible via the bus 110. In the illustrated embodiment, mass storage 112 is distinct from memory 106 where it is included, and may generally perform storage tasks compatible with higher latency, but may generally provide lesser or no volatility. In some embodiments, mass storage 112 may be integrated with a memory 106 to form a heterogeneous memory.

The I/O interface 116 is connected to I/O device(s) 124 such as a barcode scanner capable of reading a barcode attached to packages for delivery. The EC 102 is also connected to an access door used by a delivery person in delivering packages. The EC 102 can grant access to a delivery person to deliver a package to a recipient or pick up a package returned by a recipient where a package passes the verification procedure described elsewhere herein. The EC 102 grants access by opening a door permitting the delivery person to deposit or pick up the package.

The EC 102 can also be coupled to a touch-screen I/O device 124 for permitting the delivery person to manually input information into the EC 102. The optional video adapter 114 (shown in dashed lines) provides interfaces to couple the EC 102 to a display for providing information to the delivery person.

In some embodiments, EC 102 is a built-in standalone device that can be installed in any property used for receiving one or more delivery packages. Such properties include any multi-unit/tenant property.

Figure 2:
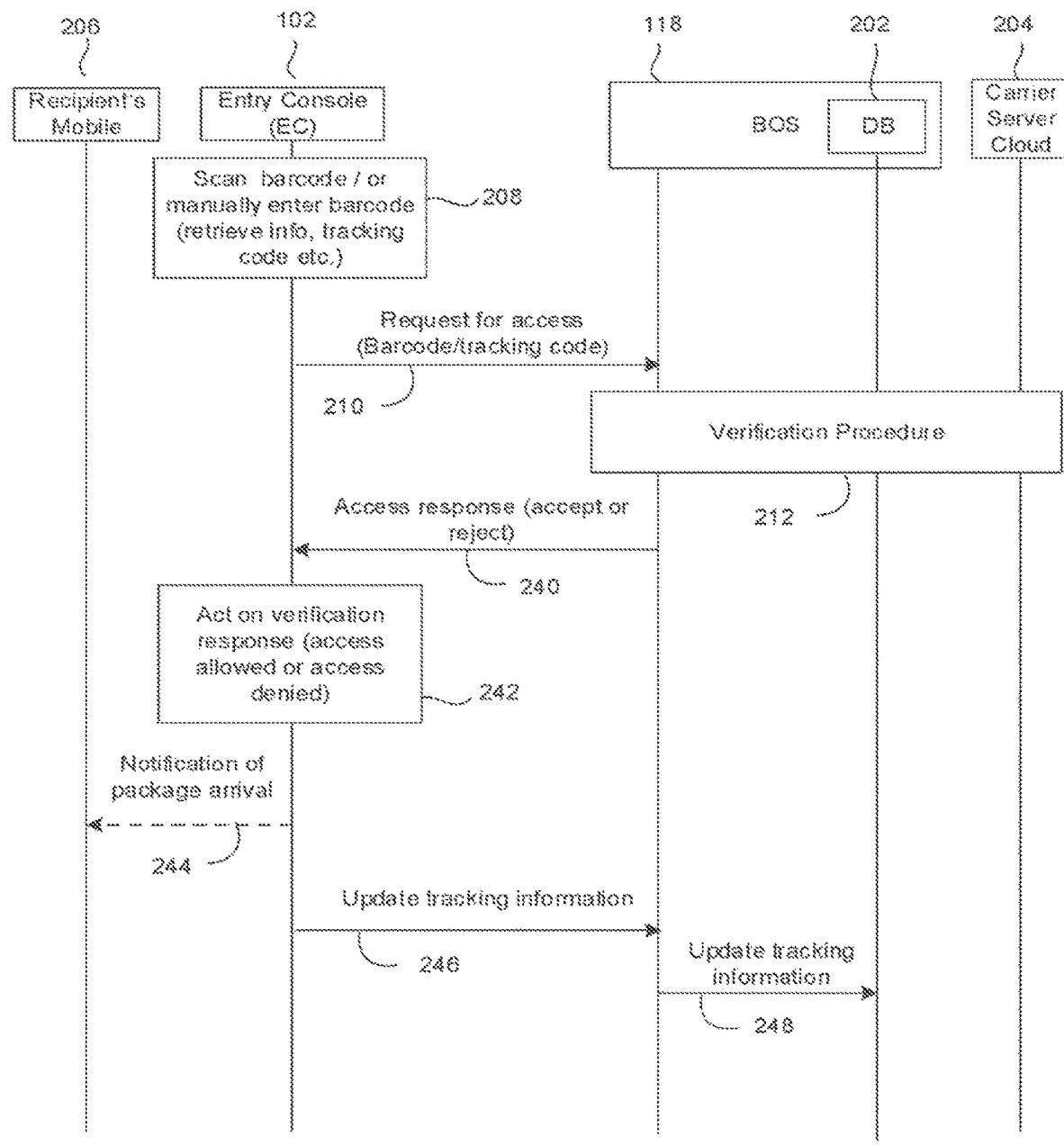
FIG. 2 is a call flow diagram of a package delivery procedure according to an embodiment of the present invention.

FIG. 2 is a call flow diagram of a package delivery procedure according to an embodiment of the present invention. In an embodiment, the package delivery procedure begins with a delivery person having arrived at the package delivery destination, the recipient's address, which would be indicated on the information label attached to the package. In another embodiment, for return of a package, the package return procedure begins with a delivery person having arrived at the package return starting point, the recipient's address, which would be notified to the carrier/delivery person by the retailer in advance. The recipient's address may also be indicated on the information label or return label attached to the package which is dropped into the designated locker/mail box. In some embodiments, the retailer may provide an information label or return label in the electronic form to the carrier/delivery person, via an email, a text message, a mobile application message, etc. For delivery of a package, at step 208, the delivery person, using the barcode scanner device 124, scans the unique barcode included as part of the information label attached to the package. Alternatively, the delivery personnel can manually enter the barcode number disclosed on the information label using the touch screen of the EC 102. For return of a package, at step 208, the delivery person, using the barcode scanner device 124, scans the unique barcode included as part of the information label provided by the retailer. Alternatively, the delivery personnel can manually enter the barcode number disclosed on the information label provided by the retailer, using the touch screen of the EC 102.

A code may be any form of information that a service provider may use to access a secured building. In the case of package delivery, a code may be a barcode.

A barcode is an encoded image (representation of data), usually displayed with black and white lines, but also in other variations, in various patterns that contains information that is readable by a machine. Barcodes may take various forms including non-specific 1 dimensional (1D) linear barcodes, 2-dimensional (2D) matrix barcodes, specialized augmented postal codes such as Postal Alpha Numeric Encoding Technique (PLANET), Postal Numeric Encoding Technique (POSTNET), Intelligent Mail barcodes, and other electronic product codes (EPC-s).

A code, for example, a barcode, includes various information, for example, a tracking code from which the following information can be determined: carrier type (the package delivery company), the sender information containing the sender's address, the recipient information containing the recipient's address, and other relevant information (packaging information). Further, the tracking code is associated with tracking information that is updated at the various stages of the delivery. The tracking information can be obtained via the tracking code to inform the sender and/or the recipient of the status of the delivery. All such information is stored and updated in a database (DB) 202 accessible by the EC 102.

Tracking information is gathered at various stages of the package delivery and maintained in the DB 202. Tracking information may be gathered by reporting the arrival and/or departure of the package at the various stages of the packing delivery. At each stage, information including the identity of the package, the location, the time, and the status of the delivery, for example, "waiting for pick-up", "in-transit" and "out for deliver" can be uploaded and updated to the DB 202. Alternatively, tracking information may be gathered using Global Positioning System (GPS)-based vehicle tracking system, and/or beacons to locate the delivery vehicle that contains the package and record the tracking information in a real-time to DB 202. Additional information related to the package may also be gathered, for example package information relating to the temperature, humidity, pressure, acceleration, elevation, and exposure to light at different time points, which may be relevant for delicate or perishable packages.

The package information including the tracking information is maintained in a DB 202, which can be but need not be internal to the server cloud (SC) 118. The DB 202 may also within a carrier's server cloud (CSC) 204 accessible by the console's BOS 118. Alternatively, the BOS 118 may use both an internal DB 202 and an external database. The external data base may be within the CSC 204 or a separate entity, in which the external entity/DB may be accessed by both the console's BOS 118 and the CSC 204.

The delivery personal can use the barcode scanner 124 to scan 208 the barcode. Alternatively, the delivery personnel can manually enter the barcode number disclosed on the information label using the touch screen I/O device 124. The delivery personnel may manually enter the barcode number in situations where the barcode scanner is unable to read the barcode for whatever reason.

The EC 102 retrieves information 208 embedded in the scanned barcode, for example, a tracking code, from which the following information can be determined: carrier type (the package delivery company), the sender information containing the sender's address, the recipient information containing the recipient's address, and other relevant information (packaging information). Further, the tracking code is associated with tracking information that is updated at the various stages of the delivery. The tracking information can be obtained via the tracking code to inform the sender and/or the recipient of the status of the delivery.

The EC forwards 210 the retrieved information to the Building Operating System (BOS) 118. Using the retrieved information, the BOS 118 and CSC 204 perform a verification procedure 212 to ensure that the package is indeed a legitimate package addressed to the recipient in case of delivery of a package, or indeed a legitimate package returned by the recipient in case of return of a package. Following the verification procedure 212, the BOS 118 provides a response 240 instructing the EC 102 to permit or deny entry to a door associated with the recipient's address provided in the packaging information. The door associated with the recipient's address provided in the packaging information may be a door for providing access to a locker system for depositing the package to a locker associated with the recipient or for picking up the package from a locker associated with the recipient. The response may be a positive response, allowing the delivery person access via instructing the EC 102 to open the door, or a negative response, denying access to the door.

The EC 102 will then act on the response 242 from the BOS 118. If the response 240 is a positive response, for example, "access allowed", the EC 102 will open the door associated with the recipient's address for the delivery person to access the locker system for depositing the package or picking up the package. The EC 102 may display an access code that may be used at the locker system to access the recipient's locker/mailbox.

In some embodiments, for delivery of a package, where the response is positive, the EC 102 sends a message 246 to the BOS 118 indicating that the package has been delivered, and accordingly, the BOS 118 will update the tracking information in the DB 202 via a similar message 248 indicating that the package associated with the scanned barcode has been delivered to its destination. In some embodiments, for return of a package, where the response is positive, the EC 102 sends a message 246 to the BOS 118 indicating that the package has been picked up, and accordingly, the BOS 118 will update the tracking information in the DB 202 via a similar message 248 indicating that the package associated with the scanned barcode has been picked up.

In some embodiments, where the response 240 is a positive response, the EC 102 notifies 244 the recipient's mobile (RM) 206 via a message that a package addressed to the recipient has been received for delivery of a package or a message that a package returned by the recipient has been picked up for return of a package. The recipient may receive the message via various means including but not limited to email, voice message, text, and/or alert and other means of notifications/messaging.

If the response 240 is a negative response, for example "access denied", the EC 102 will not open the door. In some embodiments, the EC 102 may display a message on the display 122 for the delivery person that the access is denied. The EC 102 may include the reason for denying access, which could be one or more of the following: the carrier is not a recognized carrier; package is not "in transit" or "out for delivery" for delivery of a package; package is not "waiting for pick-up" for return of a package; and last update status is not within the past 24 hours. The reason for denying access can be provided in the response 240 provided by the SC 102. The reason for denying access may be useful to the delivery person in verifying the package at the delivery person's carrier center where more information about the package can be obtained.

In some embodiments, where the response 240 is a positive response, the EC 102 may notify the recipient's mobile (RM) 206 via a message that a package addressed to the recipient is expected to be received for delivery of a package or a message that a package returned by the recipient is expected to be picked up for return of a package. The recipient may receive the message via various means including but not limited to email, voice message, text, app notification and/or alert and other means of notifications/messaging.

Where access has been granted at step 242, the EC 102 may send a message 246 to the BOS 118 indicating that the package is expected to be deposited or expected to be picked up. Accordingly, the BOS 118 will update the tacking information in the DB 202 via a similar message 248 indicating that the package associated with the scanned barcode is expected to be deposited at the recipient's assigned locker for delivery of a package or expected to be picked up at the recipient's assigned locker for return of a package.

Figure 3:
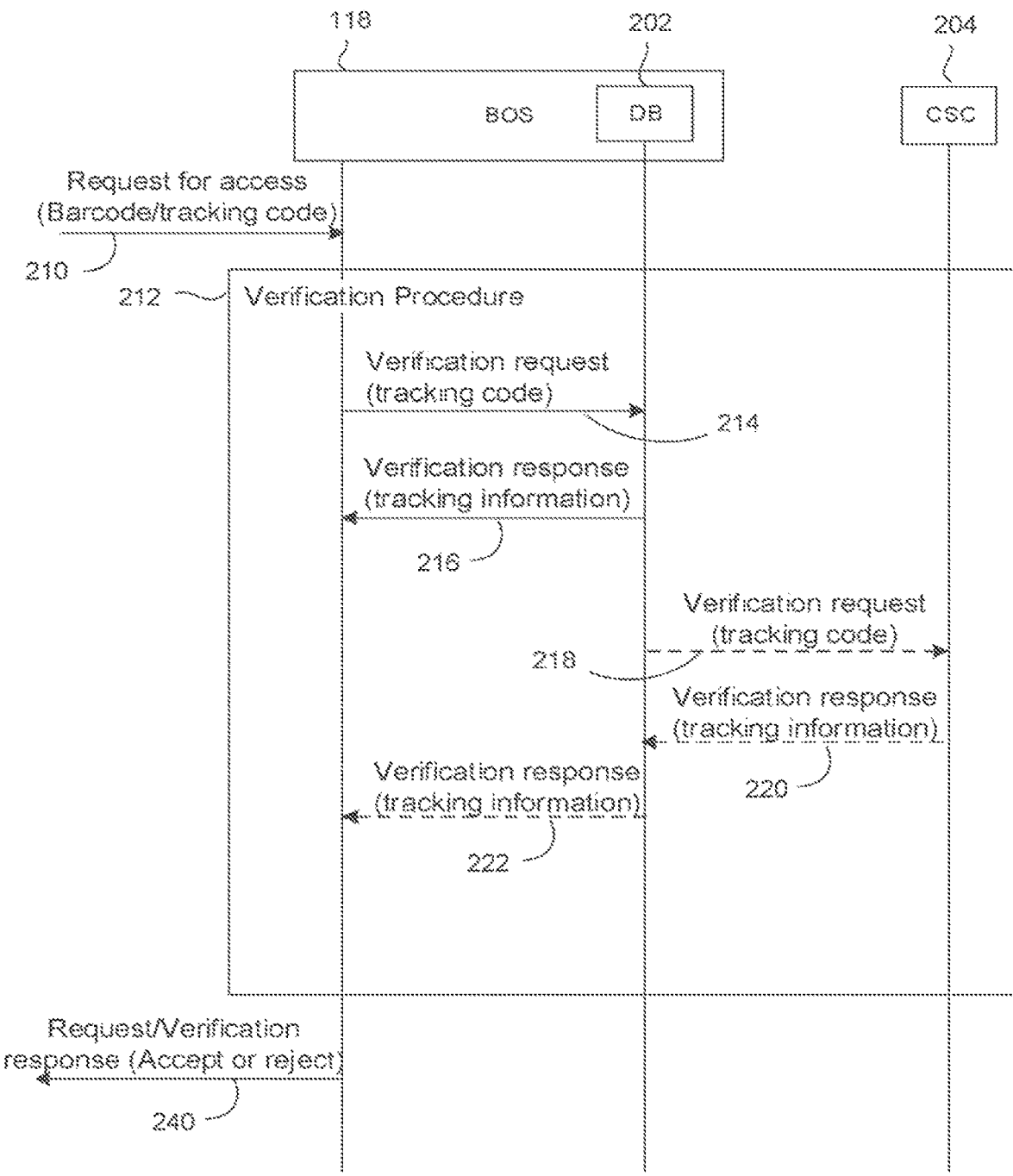
FIG. 3 is a call flow diagram of the verification procedure discussed in FIG. 2 according to an embodiment of the present invention.
Figure 4:
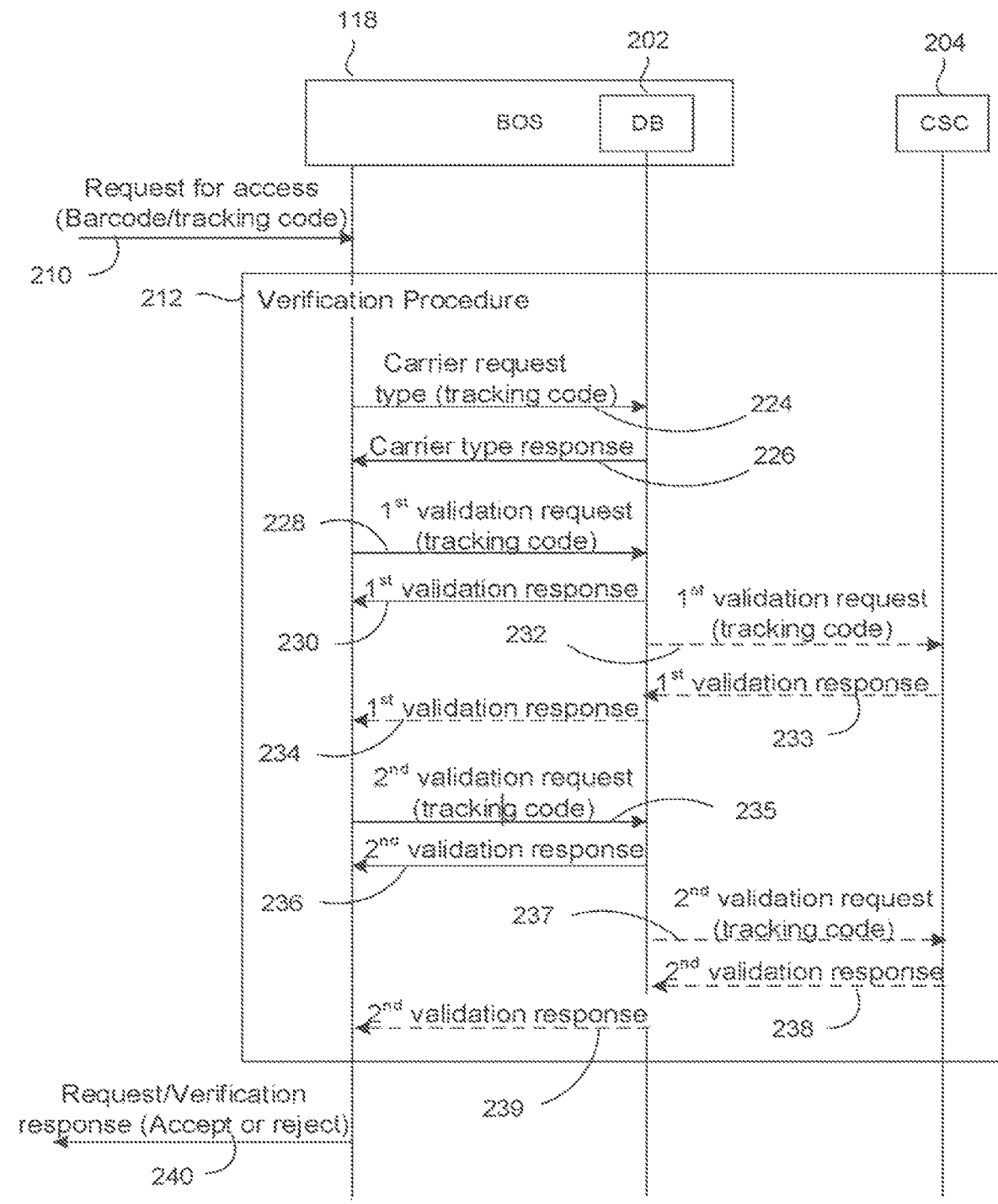
FIG. 4 is another call flow diagram of the verification procedure discussed in FIG. 2 according to an embodiment of the present invention.

FIG. 3 and FIG. 4 are call flow diagrams of the verification procedure 212 discussed in FIG. 2 according to embodiments of the present invention.

Referring to FIG. 3, when the BOS 118 receives the retrieved information including the unique tracking code 210, the BOS 118 sends a verification request 214 including the retrieved information to its local DB 202. The request 214 requests the following information: the carrier type associated with the tracking code; whether the package associated with the tracking code has a delivery status of either "in transit" or "out for delivery" for delivery of a package; whether the package associated with the tracking code has a delivery status of "waiting for pick-up" for return of a package; and whether the last delivery status update associated with the tracking code is within the last 24 hours. The local DB 202 includes a list of recognized/registered carrier types including but not limited to, United Parcel Service (UPS), FedEx, Dalsey Hillblom Lynn (DHL), Canada Post, Purolator and Intelcom Express. For each carrier type, the local DB 202 may receive updates from the CSC 204 on the status of package deliveries destined for the building or picked up from the building.

At step 216, If the DB 202 has been updated by the CSC 204 with the status of the package delivery requested information, the DB 202 responds by providing a verification response providing tracking information 216 associated with the tracking code to the BOS 118.

Where the DB 202 determines that the carrier type of the tracking code is a registered carrier type with BOS 118 but is unable to determine whether the delivery status of the package is either "in transit" or "out for delivery" for delivery of a package or whether the delivery status of the package is "waiting for pick-up" for return of a package, the DB 202 may forward a request 218 to the carrier's server cloud 204 of the determined carrier. Where the DB 202 determines the carrier type of the tracking code but is unable to determine whether the last delivery status update of the package associated with the tracking code is within the last 24 hours, the DB 202 may also forward the request 218 to the server cloud 204 of the determined carrier.

In some embodiments (not shown), the BOS 118 may forward the request 218 to the CSC 204, instead of the DB 202 sending the request 218 to the CSC 204. Upon receiving the request 218, the CSC 204 can search its internal network, including the GBS-based vehicles to locate the delivery vehicle that contains the package and record the tracking information 220 in real-time to DB 202.

Accordingly, the DB 202 provides the updated tracking information 222 to BOS 118.

The BOS 118 sends a response 240 instructing the EC 102 whether to permit or deny access to the delivery person. The BOS 118 permits access only if the following information (required information) is provided in the verification response 216 or 222: the carrier type is recognized; the delivery status associated with the tracking code is either "in transit" or "out for delivery" for delivery of a package; the delivery status associated with the tracking code is "waiting for pick-up" for return of a package; and the last delivery status is updated within the last 24 hours. If any of the required information is not provided in the responses 216 and/or 222, the response 240 is a negative response, denying access to the delivery person.

FIG. 4 is alternative call flow diagram of the verification procedure 212 discussed in FIG. 2 according to embodiments of the present invention.

Referring to FIG. 4, upon receiving the request for access 210, the BOS 118 may alternatively send individual requests 224, 228, 235 to its local DB 202 for the required information in verifying the package as part of the verification procedure 212. The BOS 118 sends a carrier request 224 to the DB 202, including in the request the retrieved tracking code.

If the DB 202 recognizes the carrier type as a registered carrier type with BOS 118, then the DB 202 responds positively with the name of carrier type. Otherwise, the DB may provide a negative respond. The negative response can be a no response, or a message to the BOS 118 that the DB does not recognize the carrier type of the tracking code. If the BOS 118 receives a negative response for carrier type, the BOS 118 accordingly sends a negative response at step 240 denying access to the delivery person.

Where the BOS 118 receives a carrier type response 226 recognizing the carrier type of the tracing code, BOS 118 sends a first validation request 228 to DB 202 requesting whether the delivery status associated with the tracking code is either "in transit" or "out for delivery" for delivery of a package, or whether the delivery status associated with the tracking code is "waiting for pick-up" for return of a package.

The DB 202 may respond that the delivery status is either "in transit" or "out for delivery" for delivery of a package or that the delivery status is "waiting for pick-up" for return of a package, provided DB 202 has been updated by the CSC 204. The DB 202 may provide a negative response to the request 228; the negative response may be that DB has no information on the delivery status or a current delivery status other than "in transit" and "out for delivery" is associated with the tracking code for delivery of a package, or a current delivery status other than "waiting for pick-up" is associated with the tracking code for return of a package.

Where the DB 202 provides a negative response, the DB 202 may forward the first validation request 232 to the server cloud 204 of the recognized carrier type.

The CSC 204 can search its own network, including the GBS-based vehicles to locate the delivery vehicle that contains the package and record the tracking information 233 in real-time to DB 202. The tracking information 233 may include an update to the delivery status indicating "in transit" or "out for delivery" for delivery of a package or an update to the delivery status indicating "waiting for pick-up" for return of a package; and accordingly, the DB 202 forwards the tracking information 234 to BOS 118.

If the response 234 is a negative response, meaning that the response does not include a delivery status that is one of "in transit" or "out for delivery" for delivery of a package or that the response does not include a delivery status that is "waiting for pick-up" for return of a package, then the BOS 118 sends a negative response at step 240 the EC 102 denying access to the delivery person.

If the validation response 232 or 234 is a positive response indicating that the delivery status associated with the tracking code is one of "in transit" or "out for delivery" for delivery of a package or that the delivery status associated with the tracking code is "waiting for pick-up" for return of a package, then the BOS 118 sends a second validation request 235, requesting the DB 202 if the last update status associated with the tracking code was within the last 24 hours.

It should be noted that BOS 118 can request the first 228 and second 235 validation requests in any order; and in some embodiments the BOS 118 may only ask for one validation request including both the first and second validation requests in one request.

The DB 202 may provide a positive or a negative response 236 to the BOS 118. The positive response being that the last update status is within the last 24 hours and the negative response is that the last update status is not within the last 24 hours. If the DB 202 was last updated by the CSC 204, then the response 236 is a positive response, otherwise response 236 is a negative response.

Where the DB 202 provides a positive response 236 to BOS 118, having also provided a positive response for carrier type 226 recognizing a carrier type and a positive response 230 for the first validation request 228, then the BOS 118 sends a positive verification response 240 to the EC 102 allowing access to the delivery person.

Where the DB provides a negative response 236, the DB may forward the request 237 for the second validation request to the carrier's server cloud 204 of the recognized carrier. The CSC 204 can search its own network, including the GBS-based vehicles to locate the delivery vehicle that contains the package and record the tracking information 233 in real-time to DB 202. The tracking information 238 may include an update to the delivery status; and accordingly, the DB 202 forwards the tracking information 239 to BOS 118, indicating a status update within the last 24 hours.

If the response 239 is a negative response, meaning that the response indicates a last update status beyond the last 24 hours, the BOS 118 sends a negative response 240 the EC 102 denying access to the delivery person.

Figure 5:
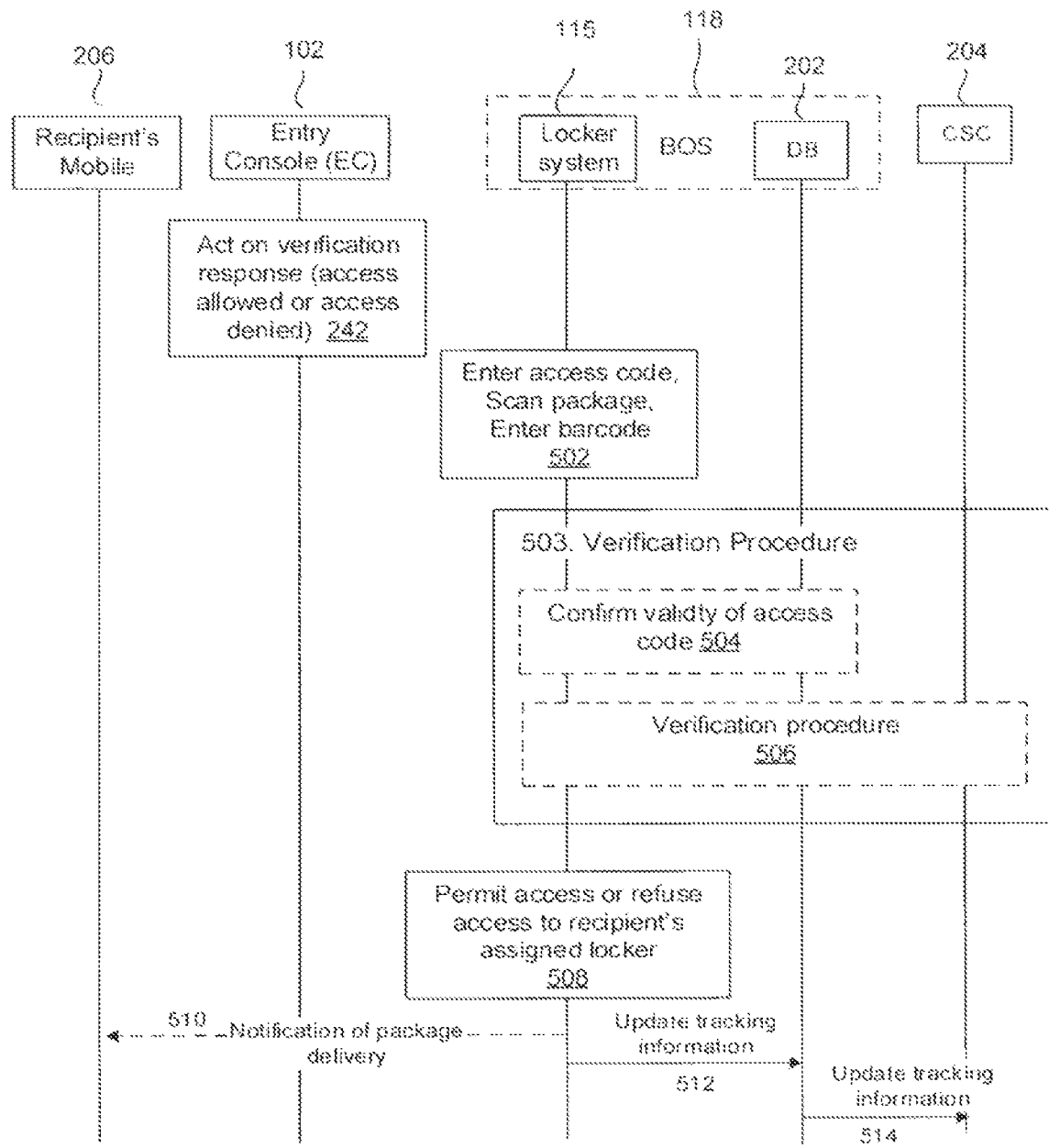
FIG. 5 illustrates a call flow diagram for depositing a package using the locker system, according to embodiments of the present invention.

FIG. 5 illustrates a call flow diagram for depositing a package using the locker system, according to embodiments of the present invention.

As discussed in step 242 of FIG. 1, where the response is a positive response, the EC 102 will permit the delivery person to have access to the locker system 115 for depositing the package at the recipient's assigned locker/mail box for delivery of a package or picking up the package at the recipient's assigned locker/mail box for return of a package.

Referring to FIG. 5, the locker system 115 includes a plurality of locker/mail boxes, each assigned to a registered tenant/recipient of the building, as determined by the BOS 118. The locker system 115 may be separate from or part of the BOS 118, but must be able to communicate with the BOS 118.

Where the delivery person has been permitted access to the locker system at step 242, the delivery person may proceed to depositing the package for delivery of a package, or picking up the package for return of a package.

At step 502, the delivery person may enter the access code that was displayed on the EC's display 122 at step 242. Alternatively, the delivery person, using the barcode scanner of the locker system 115, may scan the package's bar code, or the barcode included as part of the information label, or manually enter the barcode.

The access code may have a limited validation window during which the delivery person must use to deposit the package at the locker system.

At steps 503 and 504, where the access code is used to access the recipient's locker, the locker system may confirm validity of the access code. The locker system 115 confirms the validity of the access code by confirming that the time window has not expired, and further confirming that the access code is associated with a recorded verification response in the local DB 202 and message at step 246 and/or 248 that the package is expected to be deposited or picked up at the locker system 118. In some embodiments, the delivery person may fail to complete the required steps or operations before the time window expires, due to multiple packages, a bulky package, a package requiring special handling or other factors. In such circumstances, the delivery person may be allowed to re-open the time window, continue with the unfinished steps or operations, or start over. In some embodiments, the delivery person may have the option to choose the appropriate time window, for example, a longer time window or consecutive time windows for multiple packages, a bulky package, a package that requires special handling, or the like. In some embodiments, the delivery person may be allowed to contact the recipient/consumer, the sender/retailer, the security personnel of the building, the carrier personnel, or the like for further assistance.

At steps 503 and 506, where the validation window for the access code has expired, or the delivery person has decided to scan or manually input the bar code to access the recipient's locker, then the locker system 115 along with the local DB 202 and the CSC 204 performs the verification procedure as described with reference to step 212 of FIG. 2, and further described in FIG. 3 and FIG. 4.

At step 508, If the verification procedure at step 503 results in a confirmation of the validity of access code at step 504 or a positive response to the verification procedure at step 506, then the locker system will permit access to the recipient's locker.

If at step 504 the access code determined not be valid, then the locker system will deny access to the recipient's locker and display a message. The message may indicate that the delivery person should attempt to deposit the package or pick up the package using the barcode. Further the message may indicate that the validation window has expired. In some embodiments, the message may further indicate other options such as re-opening the validation time window, contacting the recipient/consumer, the sender/retailer, the security personnel of the building, the carrier personnel, or the like, and etc. The message may also indicate that the access code is not associated with a verified response (referring to the response at step 240 of FIGS. 2, 3 and 4.

If the verification procedure 506 results in a negative response, then the locker system 115 will refuse access to the recipient's locker and display a message. The message may indicate the reason for the negative response as was discussed above, and reproduced here for convenience. The reason for refusing access may be one or more of the following: unregistered recipient, the carrier is not a registered carrier; package is not "in transit" or "out for delivery" for delivery of a package; package is not "waiting for pick-up" for return of a package; and last update status is not within the past 24 hours.

At step 510, where the delivery person is permitted access to the recipient's assigned locker at step 508, the locker system 115 may notify the recipient's mobile (RM) 206 via a message that a package addressed to the recipient has been received or that a package returned by the recipient has been picked up. The recipient may receive the message via various means including but not limited to email, voice message, text, app notification and/or alert and other means of notifications/messaging.

At step 512 and 514, where access has been granted at step 508, the locker system 115 will update the tacking information in the DB 202 via a message indicating that the package associated with the scanned barcode has been deposited at the recipient's assigned locker or that the package associated with the scanned barcode has been picked up at the recipient's assigned locker.

At step 514, the local DB 202 will then notify the CSC 204 that the package has been received at the recipient's address or that the package has been picked up at the recipient's address.

Figure 6:
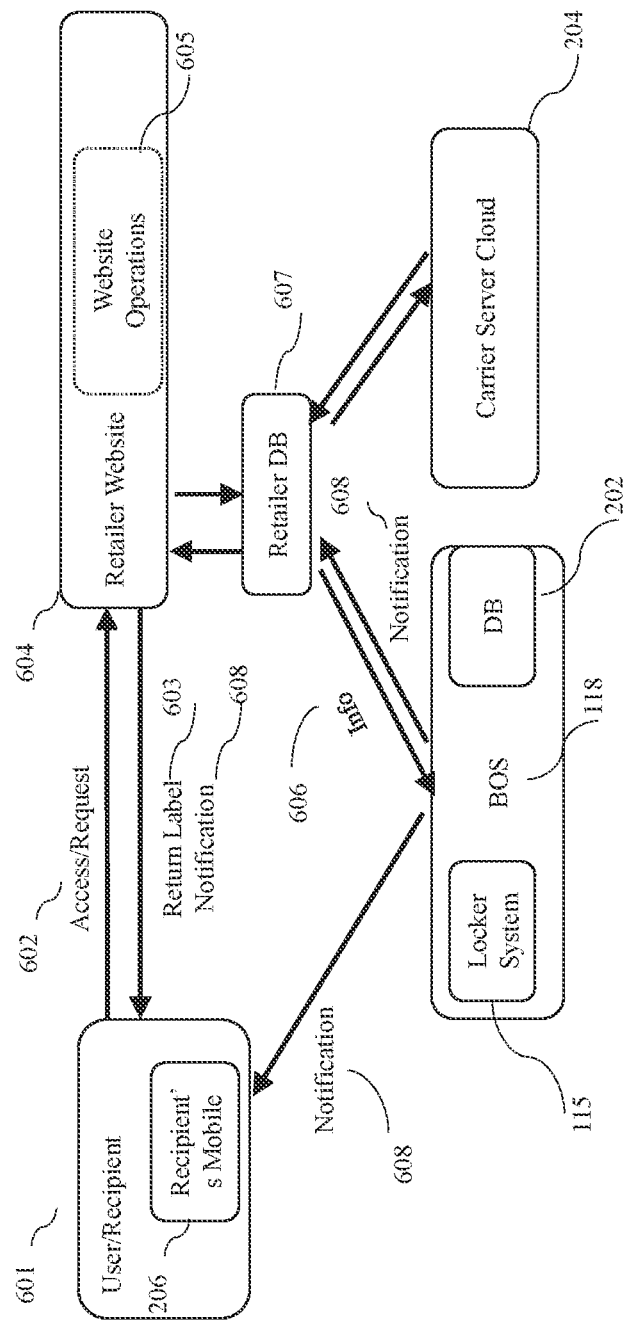
FIG. 6 is a call flow diagram of a package return procedure according to an embodiment of the present invention.

FIG. 6 illustrates a package return procedure according to an embodiment of the present invention. In some embodiments, a recipient or a user 601 wishing to return a package may access 602 the retailer's website 604 (e.g., Amazon's website) and obtain a return label 603. The access or request of user 601 may be sent from the recipient's mobile 206 or any other electronic or computing device 801 (e.g., illustrated in FIG. 8). In some embodiments, a return label may be prepared and included in the package in advance by the retailer. The retailer website 604 may provide a series of website operations 605 relating to a package or a placed purchase order. For example, on the retailer's website 604, the recipient may select the package drop-off site as a locker system including a locker/mail box in a secured building or a secured locker system including a locker/mail box outside the building. The selection of package drop-off site or pick-up location or any other information obtained on the website will be synchronized into a retailer database (i.e., retailer DB 607). The information 606 including drop-off site selection will be communicated from the retailer DB 607 to the BOS 118 and/or DB 202. Similarly, the same information 606 will be communicated from the retailer DB 607 to carrier server cloud 204. The recipient may scan the return label 603 at the locker system 115 (e.g., entry console 102), then an assigned locker/mail box will open automatically. If there is one or more access doors associated with the locker/mail box, the access door(s) will also open automatically. Once the package is deposited or dropped off at the assigned locker/mail box and the locker/mail box is closed, a notification 608 will be sent to the retailer (e.g., Amazon) DB 607 indicating that the return package is in the assigned locker/mail box, ready to be picked up. Accordingly, a notification 608 will also be sent to a delivery person for pick up. The notification for package pick-up sent to the delivery person may include a code or barcode that may be used on the entry console. The delivery person may scan the code at the locker system (e.g., entry console) and be allowed to enter a secure building or a secured locker system for package pick-up in accordance with the aforementioned procedures (e.g., illustrated by FIG. 2 to FIG. 5). In some embodiments, an update notification 608 from the BOS 118 could be sent to resident that the package has been picked up. An update notification 608 from the retailer DB 607 could also be sent to resident that the package has been picked up.

Figure 7:
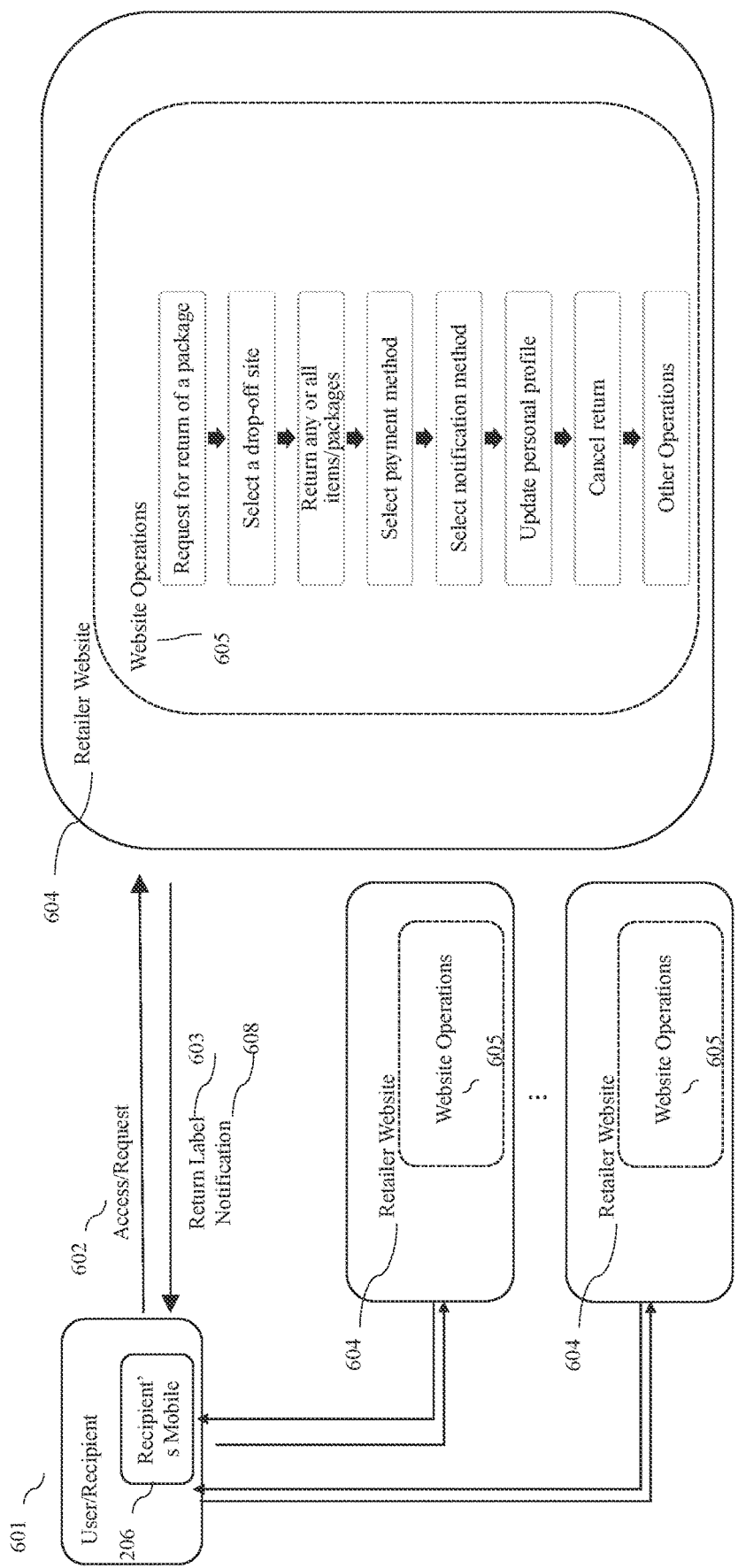
FIG. 7 is a call flow diagram for integrating a mobile application with a retailer website according to an embodiment of the present invention.

FIG. 7 illustrates the integration of a mobile application with a retailer website according to an embodiment of the present invention. In some embodiments, the mobile application is configured to be a gateway to one or more of the retailer websites 604. Generally, the mobile application is operated or controlled by a computing device (e.g., a computer or a mobile phone).

For example, the recipient may request for return of a package through the mobile application by performing one or more of the following operations (i.e. website operations 605): the recipient may select a package drop-off site as a locker system including a locker/mail box in a secured building or a secured locker system including a locker/mail box outside the building; the recipient may select to return any or all of the packages received or any or all items of a particular package in accordance with the return policy of a specific retailer; the recipient may select the payment method and proceed to payment if a return shipping fee is required in accordance with the return policy of a specific retailer; the recipient may select the message notification method (e.g., email, text message etc.); the recipient may update his or her personal profile including contact phone number, email address and etc. In some embodiments, the recipient may receive a return label (e.g., in the form of a code or a barcode) via the mobile application, or via text message or email etc. In some embodiments, the recipient may cancel the return of a package via the mobile application if he/she changes his/her mind before the package is picked up by the delivery person. In some embodiments, any or all of the website operations may be performed in any feasible sequence.

Figure 8:
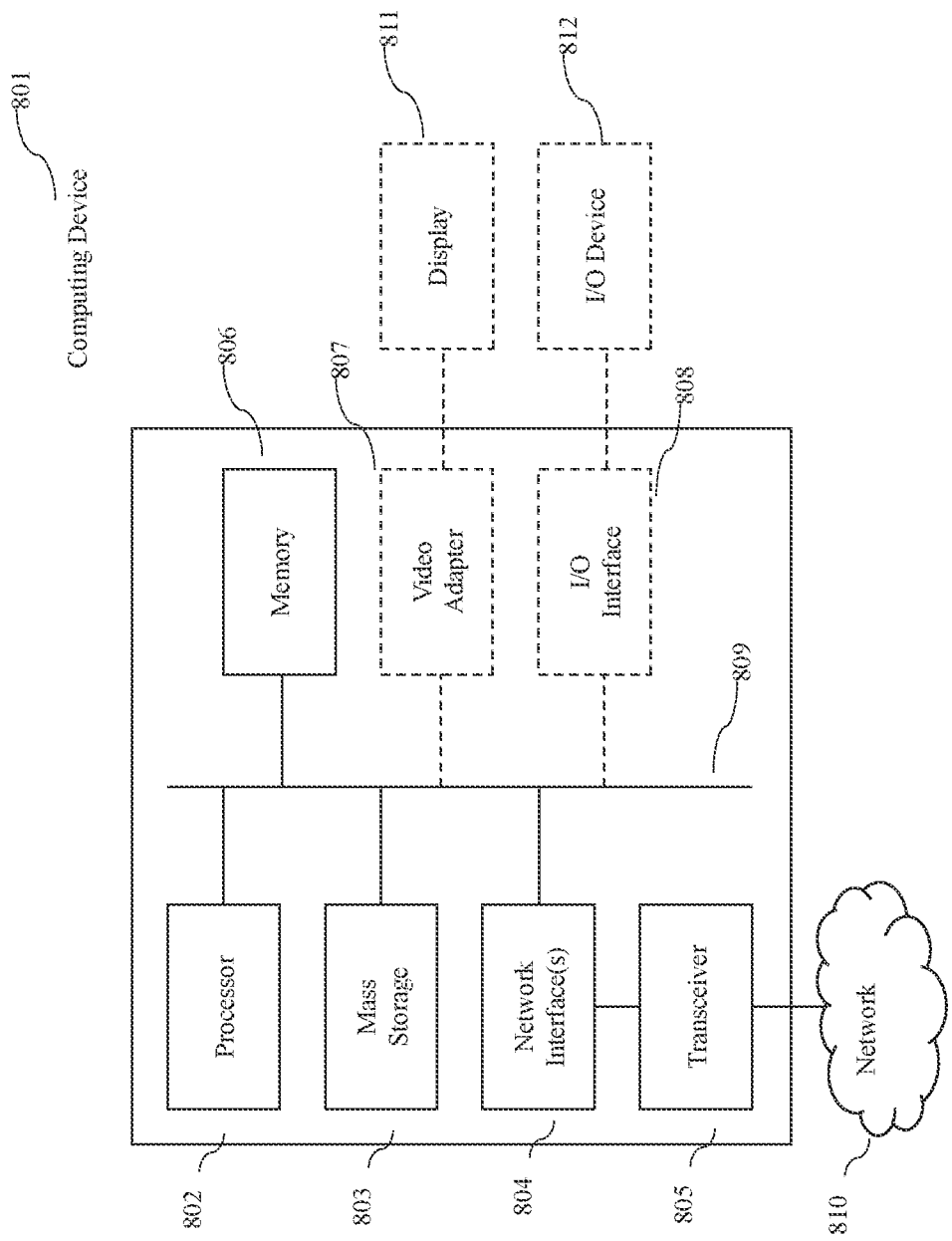
FIG. 8 a schematic diagram of a computing device used as a mobile application controller according to an embodiment of the present invention.

FIG. 8 is a schematic diagram of a computing device 801 that may be used as a mobile application controller. A controller may perform any or all of mobile application operations explicitly or implicitly described above, according to different embodiments of the present invention. For example, a computer or a mobile phone equipped with network function may be configured as a computing device 801. In some embodiments, the computing device may be coupled to the Building Operating System (BOS) wherein the computing device is configured to send a message to or receive a message from the BOS.

As illustrated in FIG. 8, the computing device 801 includes a processor 802, such as a central processing unit (CPU) or specialized processors such as a graphics processing unit (GPU) or other such processor unit, memory 806, non-transitory mass storage 803, I/O interface 808, network interface 804, video adaptor 807, and a transceiver 805, all of which are communicatively coupled via bi-directional bus 809. Video adapter 807 may be connected to one or more of display 811 and I/O interface 808 may be connected to one or more of I/O devices 812 which may be used to implement a user interface. According to embodiments, any or all of the depicted elements may be utilized, or only a subset of the elements. Further, the computing device 801 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 806 may include any type of non-transitory memory such as static random access memory (SRAM), dynamic random access memory (DRAM), synchronous DRAM (SDRAM), read-only memory (ROM), any combination of such, or the like. The mass storage element 803 may include any type of non-transitory storage device, such as a solid state drive, hard disk drive, a magnetic disk drive, an optical disk drive, USB drive, or any computer program product configured to store data and machine executable program code. According to embodiments, the memory 806 or mass storage 803 may have recorded thereon statements and instructions executable by the processor 802 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations, or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, software-related operations of the method may be executed on any computing device, such as a personal computer, server, PDA, or the like and pursuant to one or more, or a part of one or more, program elements, modules or objects generated from any programming language, such as C++, Java, Python, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Furthermore, additional security and management functions may be provided to the building residents by installing without limitation one or more of the following widgets or accessories in a secured building or in a secured locker system: a motion detector, a body heat sensor, a camera with a face recognition element and/or a voice recognition element, a display screen, etc. or a combination thereof.

In some embodiments, the widgets or accessories may be separate from or part of the BOS 118 but must be able to communicate with the BOS 118.

In some embodiments, one or more of motion detectors are deployed to perform a motion detection function, in order to enhance the safety and security of the building's residents and properties, etc. As an important component of any security system, the motion detectors may use sensors to detect a change in the position of an object or a person relative to the surroundings or a change in the surroundings relative to an object or a person. As a baseline, a list of authorized activities may include a motion trajectory of moving from a building entrance across the lobby to the elevator, or a motion trajectory of engaging with an Entry Console (EC) 102 for a reasonable period of time and then proceeding to the locker/mail boxes, or temporarily pausing in front of a display screen, etc. The motion detection function may be used to detect any suspicious, dangerous, unauthorized activities in real time (e.g., suspiciously lingering at a certain spot, repetitive violent behaviors, fire hazards), and it may further include promptly sending alert messages to the BOS, security personnel of the building, and/or the building's residents. In some embodiments, the BOS may be configured to automatically take further actions (e.g., call the police, contact the city's fire department, etc.). In some embodiments, different parameters (delays, thresholds, etc.) of the motion detectors may be changed, and the database of authorized activities and/or unauthorized activities may also be updated in real time.

In some embodiments, one or more of body heat sensors are deployed within the building or even outside the building to perform a body temperature checking function. The body temperature checking function includes monitoring the body temperature of a person entering and exiting an entrance, an exit or a designated area (e.g., before the elevator, before the access door of the locker system, etc.). In some embodiments wherein the body heat sensors may be coupled with the display screens, the body temperature checking function may include displaying the body temperature being measured, with or without a message indicating "normal human temperature", "above normal human temperature", etc. In some embodiments, the body temperature checking function may include sending alert messages. For example, during the COVID-19 pandemic, the body heat sensors may be configured to notify the BOS 118 promptly if one or more persons (e.g., delivery person, service provider, resident etc.) are detected with abnormal body temperature, and the BOS 118 may further send alert messages to security personnel of the building, intended package recipient and/or other building residents, carrier personnel, or the like. The delivery person having an abnormal body temperature may be further denied access to the secured building, the secured locker system or an access door as part of the COVID-19 preventive measures. In some embodiments, the person having abnormal body temperature may be asked to verify his or her identify (e.g., name, address, etc.) via the EC 102 (e.g., a touch-screen I/O device 124) or a face recognition or voice recognition widget if applicable. For example, the identity of the person may be automatically recognized or verified by comparing his or her face or voice with the information stored in the DB 202, or the like.

In some embodiments, one or more of cameras (e.g., improved 3D cameras) are deployed to perform a human recognition function. The camera is able to capture the depth and points of a person's face contour to support face recognition and it may also be configured to support voice recognition. Such software and/or hardware widgets are capable of identifying or verifying a person through an image, video, or any audiovisual element of the person. Accordingly, a matching analysis may be triggered to determine the similarity between this person's face and/or voice with a database storing biometrics profiles. For example, the matching analysis may be conducted via the BOS 118, and the biometrics profiles (including faces, voices etc.) of an authorized person (e.g., a building resident, a security personnel, a delivery person) may be stored in DB 202. The BOS 118 may be further configured to access public/online/ remote database storing biometrics profiles (e.g., criminal suspects wanted by the RCMP). In some embodiments, the human recognition function may be deployed simultaneously with the motion detection function. For example, an alert message may be sent to the security personnel of the building if the BOS 118 determines that an unauthorized person is engaging an unauthorized activity within or near the secured building or secured locker system (e.g., sleeping in the lobby, vandalizing the locker, etc.).

In some embodiments, one or more of display screens are placed within the secured building, within the secured locker system, or anywhere close to either of them to perform a display function. In some embodiments, the BOS 118 may centrally manage the display screens, including controlling the display contents on the screens. For example, Lost-and-Found items, missing pets, AMBER alerts, COVID-19 related information, and any security-related information may be displayed. Public transport information such as bus schedules and weather information may also be monitored and displayed on the display screens. In some embodiments, the display screen may be configured as a user interface, allowing navigating or searching of the general information displayed, or further allowing Internet searches. For example, a display screen may be embodied as a touch-screen I/O device 124 coupled with the EC 102.

Furthermore, any of the aforementioned functions may further initiate a series of remaining functions, including one or more of a motion detection function, a body temperature checking function, a human recognition function including face and/or voice, a display function, and a combination thereof. For example, if the motion detection function detects an unauthorized activity or activities, a human recognition function may be triggered to verify if the person is an authorized person such as a building resident, or a guest of a building resident, a delivery person, etc. If the human recognition function has previously verified that person is an authorized person (e.g., via cameras located outside the entrance) before the motion detectors capture any unauthorized activities, the BOS may not trigger subsequent security actions based on the person's unauthorized activities (e.g., even if that person lingers for a longer period of time in front of the elevator, etc.). For example, if the body temperature checking function detects abnormal body temperature, a human recognition function may be subsequently triggered to verify the identity of the person, and a display function may also be triggered. In other words, the sequence of performing the series of functions may not be limited by the embodiments herein.

Example embodiments described herein provide methods and systems for access to a secured building and access to a secured locker system. Although example embodiments are described in reference to a service provider delivering or picking up a package, a person skilled in the art may apply the methods and systems as described by example embodiments herein for access to a building or a locker system in the case of other service providers, who require access to the building or the locker system. Accordingly, delivery a package is but one example of a service provider, and thus the methods and systems described herein are not limited to such example.

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Other embodiments consistent with the present disclosure will be apparent from consideration of the specification and the practice of the disclosure disclosed therein. Accordingly, the specification and the embodiments disclosed therein are to be considered examples only, with a true scope of the disclosure being disclosed by the following numbered claims.

What is claimed is:

1. A real-time method of accessing a multi-tenant building or portion thereof (MTBOPT) by delivery personnel for pickup of a package, the method comprising:
   receiving, by an entry console of the MTBOPT, a request for entry into the MTBOPT, wherein the request comprises a tracking code associated with the package;
   forwarding, by the entry console, the tracking code to a building operating system (BOS);
   performing, by the BOS, a verification procedure based on the tracking code, the verification procedure comprising:
      sending, by the BOS, a verification request comprising the tracking code to one or more databases, wherein the one or more databases comprise tracking information for a plurality of packages including a delivery status of each package in the plurality of packages;
      comparing the tracking code in the verification request to the tracking information in the one or more databases; and
      determining that access to the MTBOPT is permitted based on the comparison and the tracking information in the one or more databases confirming that a pickup location of the package is in the MTBOPT and the delivery status of the package is waiting for pickup;
   causing, by the BOS, the entry console to open a door of the MTBOPT in response to an outcome of the verification procedure being positive, wherein the outcome of the verification procedure is positive based on the determination that the access to the MTBOPT is permitted.

2. The method of claim 1, wherein the pickup of the package is via a locker system or portion thereof in or in proximity to the MTBOPT.

3. The method of claim 1 further comprising accessing a secured locker system or portion thereof.

4. The method of claim 3, further comprising causing, by the BOS, the entry console to provide an access code for accessing the locker system or portion thereof.

5. The method of claim 2, wherein the locker system comprises a plurality of locker/mail boxes.

6. The method of claim 1, further comprising updating the one or more databases in real-time at various stages of the deliveries.

7. The method of claim 1, wherein at least one of the one or more databases comprise a database of the MTBOPT and a database of carrier picking up the package.

8. The method of claim 1, wherein the verification procedure comprises determining if the delivery status has been updated within last 24 hours.

9. The method of claim 1, wherein the tracking code is a barcode, the barcode being one of: 1 dimensional linear bar code, 2-dimensional bar code, an image, specialized augmented postal code, intelligent mail barcode, and electronic product code.

10. The method of claim 1, further comprising:
    sending a message to a device associated with the pickup location, the message indicating that access to the MTBOPT has been granted for the delivery personnel.

11. The method of claim 3, further comprising:
    sending a message to a device associated with the pickup location, the message indicating that access to the secured locker system or portion thereof has been granted for the delivery personnel.

12. The method of claim 10, wherein the device is a mobile device of a tenant associated with the pickup location.

13. The method of claim 1 further comprising performing one or more of:
    a motion detection function, by one or more of motion detectors;
    a body temperature checking function, by one or more of body heat sensors;
    a human recognition function, by one or more of cameras; and
    a display function, by one or more of display screens.

14. The method of claim 6, wherein the tracking information is updated continuously.

15. The method of claim 1, further comprising causing, by the BOS, the entry console to provide a notification denying access to the MTBOPT, wherein the outcome of the verification procedure is negative based on the determination that the access to the MTBOPT is denied.

16. The method of claim 3, further comprising causing, by the BOS, the entry console to provide a notification denying access to the secured locker system or portion thereof, wherein the outcome of the verification procedure is negative based on the determination that the access to the secured locker system is denied.

17. A method for accessing a multi-tenant building or portion thereof (MTBOPT) by delivery personnel for pickup of a package, the method comprising:
    providing a drop-off site for placement of the package by a tenant;
    receiving by the drop-off site the package placed by the tenant;
    detecting the placement of the package;
    sending upon the detection of the placement of the package, an alert notification to a carrier or retailer via a building operating system (BOS), the alert notification indicating that a package has been placed at the drop-off site and is ready for pickup; and
    initiating upon receipt of the alert notification, picking up the package from the drop off site by the delivery personnel;
    receiving, by an entry console of the MTBOPT, a request for entry into the MTBOPT, wherein the request comprises a tracking code associated with the package;
    forwarding, by the entry console, the tracking code to the BOS;
    performing, by the BOS, a verification procedure based on the tracking code, the verification procedure comprising:
       sending, by the BOS, a verification request comprising the tracking code to one or more databases, wherein the one or more databases comprise tracking information for a plurality of packages including a delivery status of each package in the plurality of packages;
       comparing the tracking code in the verification request to the tracking information in the one or more databases; and determining that access to the MTBOPT is permitted based on the comparison and the tracking information in the one or more databases confirming that a pickup location of the package is in the MTBOPT and the delivery status of the package is waiting for pickup;

causing, by the BOS, the entry console to open a door of the MTBOPT in response to an outcome of the verification procedure being positive, wherein the outcome of the verification procedure is positive based on the determination that the access to the MTBOPT is permitted.

18. The method of claim 17, wherein the drop-off site is a designated area within or in proximity to the MTBOPT.

19. The method of claim 18, wherein the drop-off site is a locker within a locker system or portion thereof in proximity to the MTBOPT.

\* \* \* \* \*